(12) United States Patent
Cho

(10) Patent No.: US 10,541,562 B2
(45) Date of Patent: Jan. 21, 2020

(54) WIRELESS POWER TRANSMITTER

(71) Applicant: WITS Co., Ltd., Yongin-si, Gyeonggi-do (KR)

(72) Inventor: Sang Ho Cho, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 212 days.

(21) Appl. No.: 15/155,549

(22) Filed: May 16, 2016

(65) Prior Publication Data

US 2016/0344237 A1    Nov. 24, 2016

(30) Foreign Application Priority Data

May 19, 2015  (KR) .................. 10-2015-0069908
Oct. 13, 2015  (KR) .................. 10-2015-0143008

(51) Int. Cl.
*H02J 50/12* (2016.01)
*H02J 50/80* (2016.01)
*H02J 7/02* (2016.01)
*H04B 5/00* (2006.01)

(52) U.S. Cl.
CPC .............. *H02J 50/12* (2016.02); *H02J 7/025* (2013.01); *H02J 50/80* (2016.02); *H04B 5/0031* (2013.01)

(58) Field of Classification Search
None
See application file for complete search history.

(56) References Cited

U.S. PATENT DOCUMENTS

| 9,071,284 B2* | 6/2015 | Wheeland | H02J 17/00 |
| 2012/0311356 A1* | 12/2012 | Tan | H02J 5/005 |
| | | | 713/310 |
| 2013/0033118 A1* | 2/2013 | Karalis | H01F 38/14 |
| | | | 307/104 |
| 2015/0035376 A1* | 2/2015 | Baarman | H02J 5/005 |
| | | | 307/104 |
| 2015/0061577 A1* | 3/2015 | Ye | H02J 7/025 |
| | | | 320/108 |
| 2015/0061580 A1* | 3/2015 | Yamakawa | H02J 50/80 |
| | | | 320/108 |
| 2015/0200563 A1* | 7/2015 | Zhang | H02J 5/005 |
| | | | 320/108 |

FOREIGN PATENT DOCUMENTS

| JP | 2013-183497 A | 9/2013 |
| KR | 10-2013-0005571 A | 1/2013 |
| KR | 10-2013-0087708 A | 8/2013 |
| KR | 10-2014-0120404 A | 10/2014 |

OTHER PUBLICATIONS

Korean Office Action dated Oct. 27, 2016 in counterpart Korean Application No. 10-2015-0143008 (7 pages in English; 5 pages in Korean).

* cited by examiner

*Primary Examiner* — Jared Fureman
*Assistant Examiner* — Joel Barnett
(74) *Attorney, Agent, or Firm* — Harness, Dickey & Pierce, P.L.C.

(57) ABSTRACT

A wireless power transmitter includes a resonator including a variable resonator; an inverter configured to operate the resonator; and, a controller configured to adjust the variable resonator in response to a change in a level of power input to the inverter.

16 Claims, 7 Drawing Sheets

WIRELESS POWER TRANSMITTER

CROSS-REFERENCE TO RELATED APPLICATIONS

This application claims the benefits of Korean Patent Application No. 10-2015-0069908 filed on May 19, 2015 and 10-2015-0143008 filed on Oct. 13, 2015, in the Korean Intellectual Property Office, the entire disclosures of which are incorporated herein by reference for all purposes.

BACKGROUND

1. Field

The following description relates to a wireless power transmitter.

2. Description of Related Art

In accordance with the development of wireless technology, various types of wireless functions range from the transmission of data to the transmission of power. Particularly, a wireless power charging technology capable of charging an electronic device, even in a non-contact state, has recently been developed.

In the above-mentioned wireless power charging environment, in a case in which a wireless power transmitter and a wireless power receiver are positioned to be symmetrical with each other, charging may be performed efficiently, but in a case in which the wireless power transmitter and the wireless power receiver are misaligned, there may be a problem in that charging efficiency may be decreased.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a general aspect, a wireless power transmitter, includes a resonator including a variable resonator; an inverter configured to operate the resonator; and, a controller configured to adjust the variable resonator in response to a change in a level of power input to the inverter.

The variable resonator may include a variable capacitor, and the controller may be further configured to adjust capacitance of the variable capacitor in response to the change in the level of power input to the inverter.

The controller may be further configured to adjust the degree of capacitance of the variable capacitor to decrease the level of power input to the inverter.

The controller may be further configured to compare a level of a first power input to the inverter before adjusting the degree of capacitance of the variable capacitor and a level of a second power input to the inverter after adjusting the degree of capacitance of the variable capacitor with each other, to determine whether to increase or decrease the degree of capacitance of the variable capacitor.

The controller may be further configured to compare a level of a first power input to the inverter before adjusting the degree of capacitance of the variable capacitor and a level of a second power input to the inverter after adjusting the degree of capacitance of the variable capacitor with each other to further decrease the degree of capacitance of the variable capacitor when the level of the second input power is lower than the level of the first input power.

The controller may be further configured to compare a level of a first power input to the inverter before adjusting the degree of capacitance of the variable capacitor and a level of a second power input to the inverter after adjusting the degree of capacitance of the variable capacitor with each other to increase the degree of capacitance of the variable capacitor when the level of the second input power is greater than the level of the first input power.

The wireless power transmitter may further include a detector configured to detect an input voltage and an input current of the inverter, and to calculate the input power from the input voltage and the input current.

The controller may be configured to adjust capacitance of the variable resonator so that the input power provided from the detector is decreased.

A wireless power transmitter includes a resonator including a variable capacitor; a detector configured to calculate a level of power input to the wireless power transmitter; and a controller configured to calculate power efficiency based on a level of power received by a wireless power receiver and the level of power input to the wireless power transmitter, and to adjust the degree of capacitance of the variable capacitor so that the power efficiency is increased.

The wireless power transmitter may further include a power supply configured to convert a voltage of the input power; and an inverter configured to receive power from the power supply and to operate the resonator.

The detector may be further configured to detect an input voltage and an input current of the power supply to detect the input power.

The wireless power transmitter may further include a near field communication circuit configured to receive information on the level of power received by the wireless power receiver from the wireless power receiver.

The controller may be further configured to compare first power efficiency before adjusting the degree of capacitance of the variable capacitor and second power efficiency after adjusting the degree of capacitance of the variable capacitor, to determine whether to increase or decrease the degree of capacitance of the variable capacitor.

The controller may be further configured to compare first power efficiency before adjusting the degree of capacitance of the variable capacitor and second power efficiency after adjusting the degree of capacitance of the variable capacitor with each other to further decrease the degree of capacitance of the variable capacitor when the second power efficiency is higher than the first power efficiency.

The controller may be further configured to compare first power efficiency before adjusting the degree of capacitance of the variable capacitor and second power efficiency after adjusting the degree of capacitance of the variable capacitor with each other to further increase the degree of capacitance of the variable capacitor when the second power efficiency is lower than the first power efficiency.

A method of controlling a wireless power transmission, includes operating a power supply to provide power to a variable resonator; actuating a detector to determine a power input to or output from the power supply; and, executing a controller to adaptively adjust a resonance characteristic of the variable resonator in response to the determining of the power input to or from the power supply.

The method may further include transmitting a wireless power signal to a wireless power receiver; operating a wireless communication circuit to receive an indicia about the received wireless power signal; adaptively adjusting the resonance characteristic of the variable resonator in response to the received wireless power signal indicia and the determining of the power input to or from the power supply The method, wherein the resonance characteristic of the variable resonator may be adaptively adjusted in response to changing power input to or from the power supply.

The resonance characteristic of the variable resonator may be adaptively adjusted in response to a comparison of the power input to or from the power supply relative to the received wireless power signal indicia which includes a reception power.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
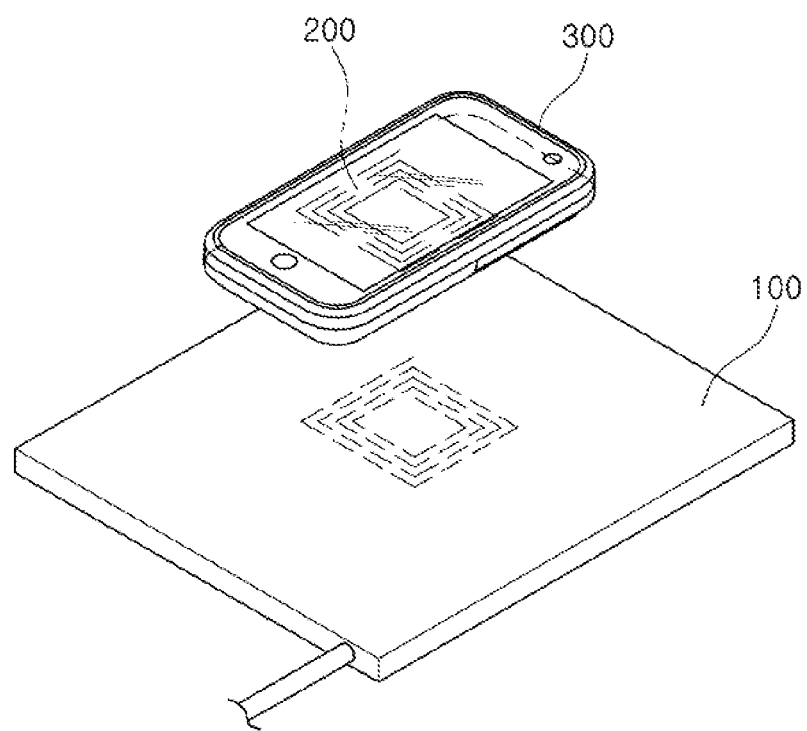
FIG. 1 is a diagram illustrating a wireless power transmitter, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there are no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" than the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the following description. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

In the drawings, for example, due to manufacturing techniques and/or tolerances, modifications of the shape shown may be encountered. Thus, embodiments should not be construed as being limited to the particular shapes of regions shown herein, but should be understood to include, for example, a change in shape resulting from manufacturing. The following embodiments may also be constituted by one or a combination thereof.

The contents of the present disclosure described below may have a variety of configurations, but are not limited thereto.

FIG. 1 is a diagram illustrating a wireless power transmitter according to an embodiment.

Referring to FIG. 1, a wireless power receiver 200 is disposed adjacent to a wireless power transmitter 100 to be magnetically coupled (for example, via magnetic resonance or magnetic induction) to the wireless power transmitter 100, thereby wirelessly receiving power.

The wireless power receiver 200 provides the received power to an electronic device 300. The wireless power receiver 200 may be a separate device which exists in the electronic device 300 as a separate component or which is connected integrally with the electronic device 300 or a battery thereof.

Although the wireless power receiver 200 and the wireless power transmitter 100 are spaced apart from each other in the illustrated example, this is merely for clarity of illustration. In fact, the wireless power receiver 200 and the wireless power transmitter 100 will generally be in contact with each other or may be adjacent to each other.

In a case in which a position of the wireless power receiver 200 and a position of the wireless power transmitter 100 correspond to each other, that is, a coil of the wireless power receiver 200 and a coil of the wireless power transmitter 100 face each other, efficiency of wireless charging is increased. In addition, a setting of wireless power charging is generally made under the assumption that the coil of the wireless power receiver 200 and the coil of the wireless power transmitter 100 face each other as described above.

However, in actuality, the position of the wireless power receiver 200 and the position of the wireless power transmitter 100 may not precisely correspond to each other, or a relative movement of the positions may occur. In this case, related art devices have problems in that the efficiency of the charging is decreased.

The wireless power transmitter 100 according to an embodiment increases the efficiency of the wireless charging, even in a case in which the position of the wireless power receiver 200 and the position of the wireless power transmitter 100 do not precisely correspond to each other, or a relative movement of the positions occurs.

Hereinafter, an embodiment of the wireless power transmitter configured to increase the efficiency of the wireless charging is described with reference to FIGS. 2 through 4.

Figure 2:
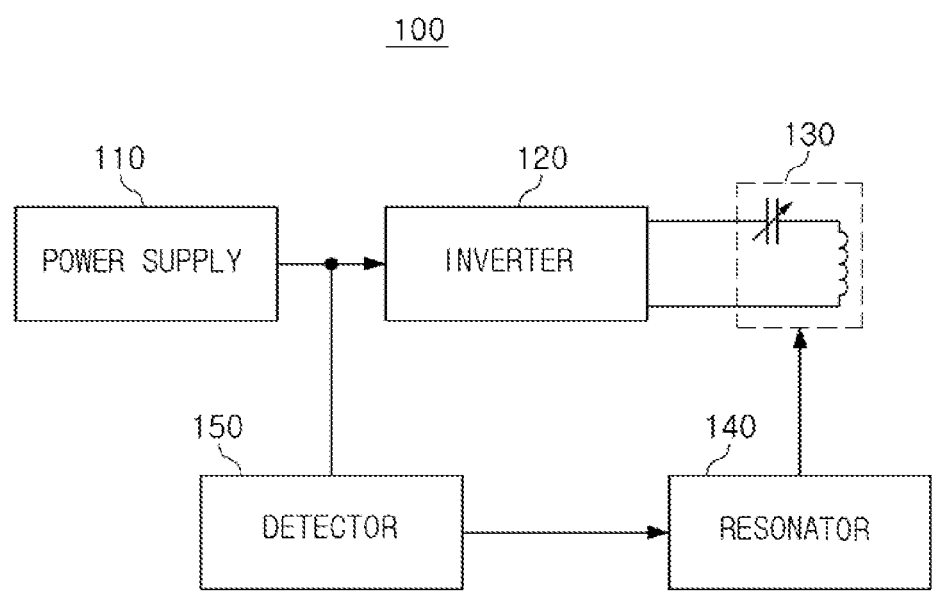
FIG. 2 is a block diagram illustrating the wireless power transmitter, according to an embodiment.

FIG. 2 is a block diagram illustrating a wireless power transmitter according to an embodiment.

Referring to FIG. 2, the wireless power transmitter 100 includes an inverter 120, a resonator 130, and a resonance controller 140. According to an embodiment, the wireless power transmitter 100 includes a power supply 110 or a detector 150.

The power supply 110 transforms power input from an outside and outputs the transformed power. For example, the power supply 110 transforms a voltage of direct current (DC) power input from the outside. The power provided from the power supply 110 is input to the inverter 120.

The inverter 120 operates the resonator 130 using the power provided from the power supply 110. According to an embodiment, the inverter 120 includes at least one switch, and adjusts the power provided to the resonator 130 according to a switching operation.

The resonator 130 includes a variable resonator. The variable resonator is configured to be magnetically coupled to a resonator of a wireless power receiver and to wirelessly transmit power.

The variable resonator includes a variable capacitor or a variable capacitance circuit (hereinafter, collectively referred to as 'variable capacitor'). Hereinafter, a description will be made in relation to an example in which the variable resonator uses the variable capacitor, but the variable resonator may also be operated by varying inductance.

The resonance controller 140 adjusts the variable resonator in response to a change in the input power of the inverter 120.

For example, in a case in which the position of the wireless power receiver is varied, an angle thereof is disturbed from a substantially optimal parallel arrangement relative to the wireless power transmitter, and the resonance controller 140 responsively increases efficiency of the wireless charging by adaptively adjusting capacitance of the variable resonator.

The detector 150 operates to detect an input current and an input voltage of the inverter 120. The detector 150 calculates the level of input power from the input voltage and the input current.

Figure 3:
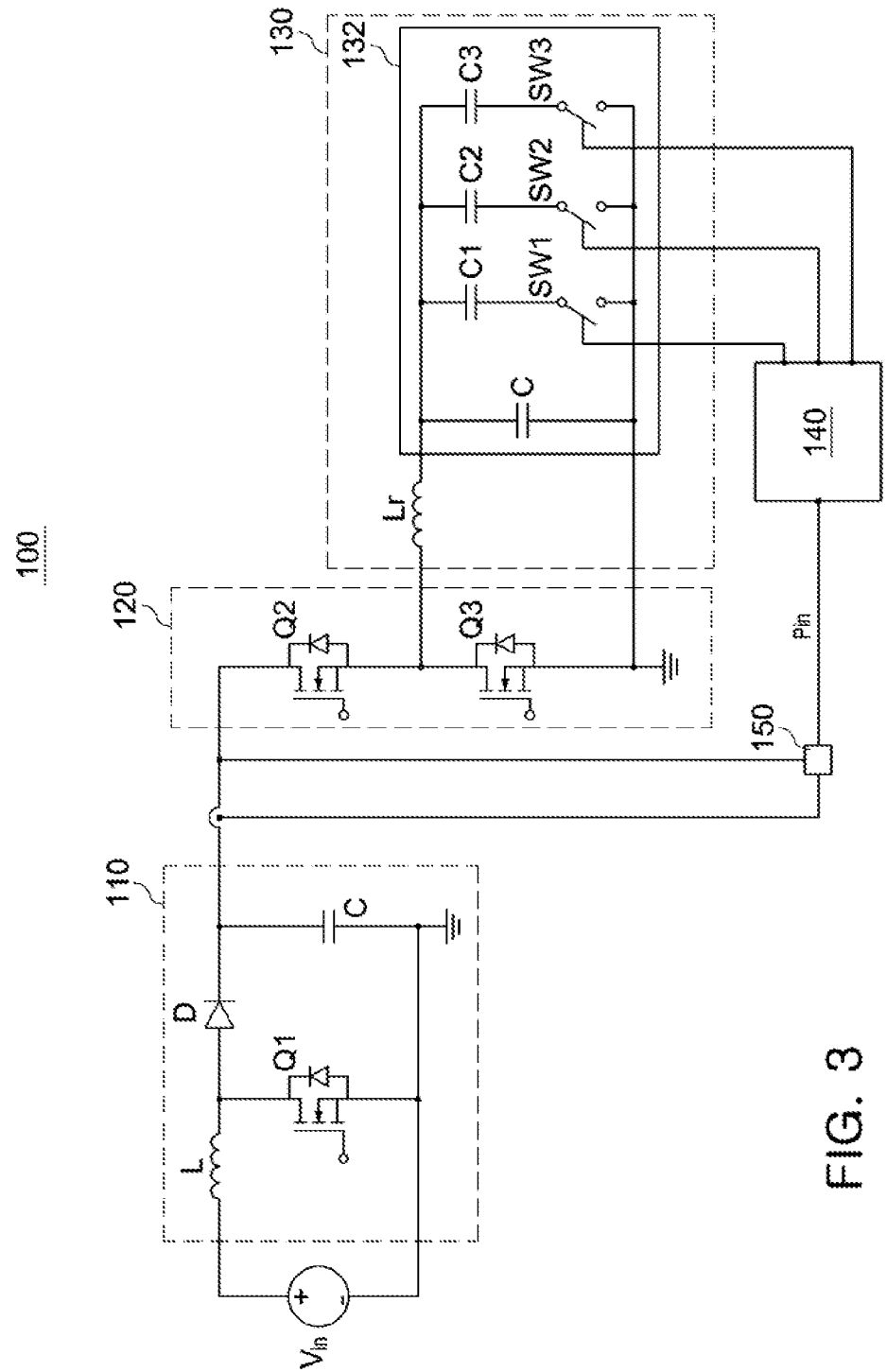
FIG. 3 is a circuit diagram illustrating the wireless power transmitter, according to an embodiment.

FIG. 3 is a circuit diagram illustrating the wireless power transmitter of FIG. 2.

An embodiment illustrated in FIG. 3 relates to an embodiment in which the level of the power input to the inverter 120 is detected, and the degree of capacitance is adaptively adjusted responsive to the detection, such that the input power is decreased.

As illustrated in FIG. 3, the wireless power transmitter 100 according to an embodiment includes the power supply 110, the inverter 120, the resonator 130, the resonance controller 140, and the detector 150.

According to an embodiment, the power supply 110 includes a direct current (DC)-DC conversion circuit, such as a boost (step-up) or buck (step-down) converter, that receives a DC voltage and outputs a DC voltage having a predetermined voltage level.

The illustrated power supply 110 is a step-up DC-DC converter including an inductor L, a first switch Q1, a diode D, and a capacitor C, but is not necessarily limited thereto, and various kinds of DC-DC converter such as a step-down DC-DC converter may be alternatively applied.

The inverter 120 transforms an output voltage of the power supply 110 into a form suitable for wireless power transmissions, for example, an alternating current (AC) voltage.

The illustrated inverter 120 is a half-bridge inverter in which two switches Q2 and Q3 are connected to each other in series, but is not necessarily limited thereto. Any suitable type of inverter such as a full-bridge inverter may also be used. In order to control the inverters, a fixed frequency scheme, a variable frequency scheme, a duty-ratio modulation scheme, a phase shift scheme, or other suitable schemes which would be known to one of skill in the art, after gaining a thorough understanding of the following description, may be used.

The power supply 110 and the inverter 120 are operated by a controller (as seen, for example, in FIG. 2) of the wireless power transmitter. The control unit adjusts an output of the wireless power transmitter by adjusting the output of the power supply 110 or adjusting the switching operation of the inverter 120. According to an embodiment, the control unit receives information on power requirements from the wireless power receiver and controls an operation of the power supply 110 or the inverter 120.

The resonator 130 is magnetically coupled to the resonator of the wireless power receiver by the AC voltage transformed by the inverter 120 to wirelessly provide the power.

The resonator 130 includes an inductor Lr and a variable capacitor 132. The variable capacitor 132 has capacitance varied by the resonance controller 140.

According to an embodiment, the variable capacitor 132 includes a main capacitor C, a plurality of auxiliary capacitors C1 to C3 which are connected to the main capacitor C in parallel, and a plurality of switches SW1 to SW3 which are connected to the plurality of auxiliary capacitors C1 to C3 in series, respectively. The illustrated variable capacitor 132 is illustrative, and as the variable capacitor 132, various circuits capable of providing variable capacitance may be applied.

The resonance controller 140 adjusts capacitance of the resonator 130. The resonance controller 140 receives input power Pin of the inverter 120 from the detector 150, and adjusts the degree of capacitance of the variable capacitor 132 so that the input power is decreased.

The resonance controller 140 may be implemented as a processing unit. According to an embodiment, the resonance controller 140 further includes a memory and/or a storage device. The processing unit may include, for example, a central processing unit (CPU), a graphics processing unit (GPU), a microprocessor, an application specific integrated circuit (ASIC), field programmable gate arrays (FPGA), and the like, and may have a plurality of cores. The memory may be a volatile memory (e.g., a RAM, or the like), a non-volatile memory (e.g., a ROM, a flash memory, or the like), or a combination thereof.

The resonance controller 140 compares a level of a first input power before adjusting the degree of capacitance of the variable capacitor and a second input power after adjusting the degree of capacitance of the variable capacitor with each other, to thereby determine whether to increase or decrease the degree of capacitance of the variable capacitor 132.

The detector 150 detects the level of voltage and the current input to the inverter 120 to calculate the input power Pin. The detector 150 is a multiplier circuit that multiplies the detected voltage and current with each other. Alternatively, the detector 150 may also be implemented as the processing unit as described above.

The resonance controller 140 confirms the input power Pin according to a change in the degree of capacitance of the variable capacitor 132, and adjusts the degree of capacitance of the variable capacitor 132 so that the detected input power Pin is decreased.

Where the input power Pin is decreased by adjusting the degree of capacitance of the variable capacitor corresponds to a case in which the efficiency of the power transmission between the wireless power transmitter and the wireless power receiver is increased.

For example, in a case in which a position between the wireless power transmitter and the wireless power receiver is varied from an optimal relative positioning, the wireless power receiver may require power enough to be charged. Accordingly, the output power of the wireless power transmitter is controlled to be increased, and the input power of the inverter 120 is correspondingly increased.

Meanwhile, in a case in which the degree of capacitance of the resonator 130 is changed in a state in which the position between the wireless power transmitter and the wireless power receiver is varied to increase the efficiency of the wireless charging between two apparatuses, the required power of the wireless power receiver may be decreased, and the input power of the inverter 120 may be decreased, accordingly.

That is, as described above, it may be appreciated that if the efficiency of the wireless charging is increased, the input power of the inverter 120 is decreased. Therefore, the resonance controller 140 adjusts the degree of capacitance of the variable capacitor 132 to follow the decrease of the input power of the inverter 120.

Figure 4:
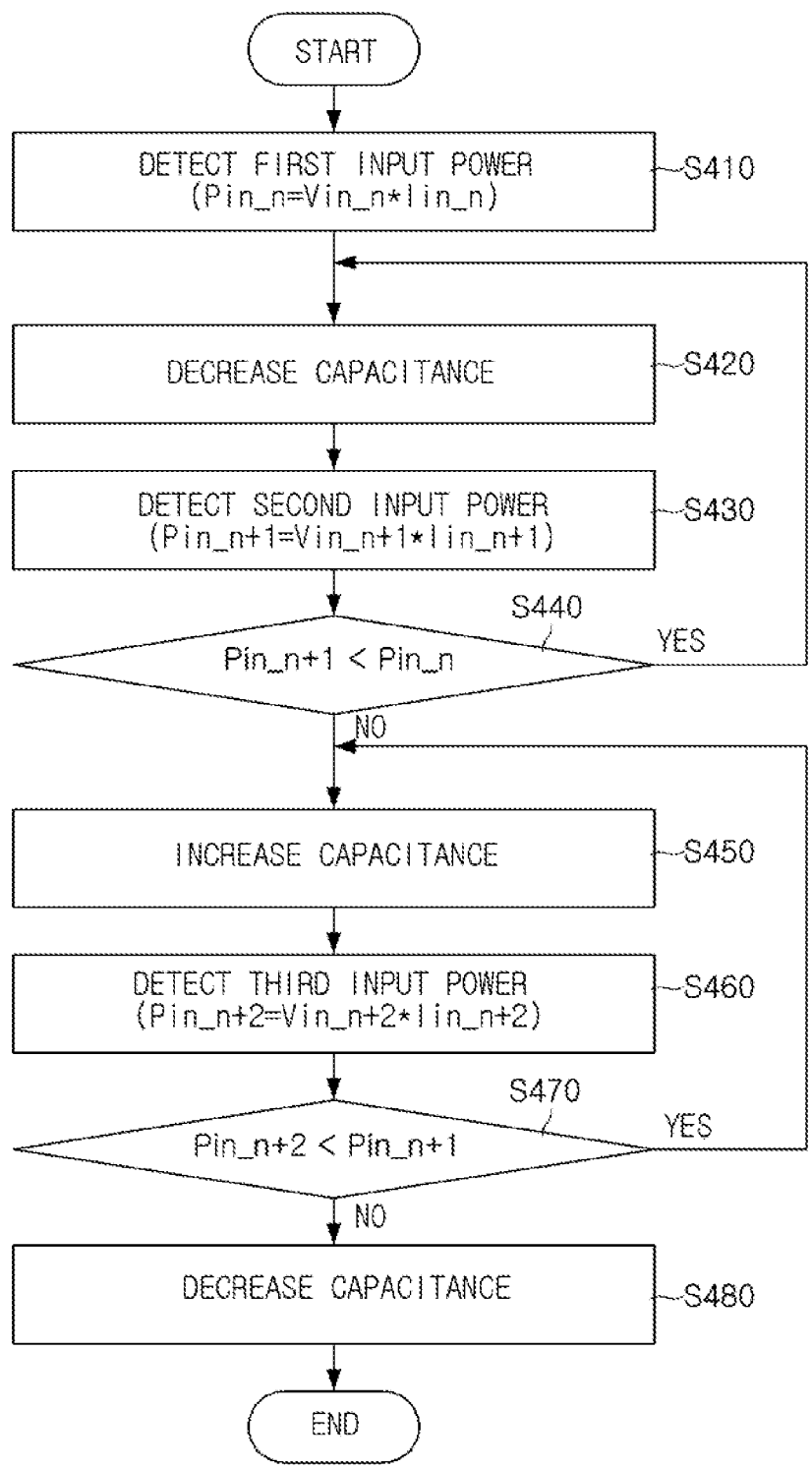
FIG. 4 is a flowchart illustrating a method for adjusting capacitance performed in a wireless power transmitter, according to an embodiment.

FIG. 4 is a flowchart illustrating a method for adjusting capacitance performed in the wireless power transmitter illustrated in FIG. 3. Hereinafter, an operation of the resonance controller 140 will be described with reference to FIG. 4. A control method using a substantially maximum efficiency point following in which the decrease of the degree of capacitance is first performed will be described in FIG. 4, but according to an embodiment, the control method is set to first perform an increase of the degree of capacitance.

The detector 150 detects the voltage and the current input to the inverter 120, and calculates first input power Pin_n using the detected voltage and current (S410). The first input power Pin_n is calculated before adjusting the degree of capacitance of the variable capacitor 132.

The resonance controller 140 decreases the degree of capacitance of the variable capacitor 132 (S420). Thereafter, the detector 150 calculates second input power Pin_n+1 after the decrease of the degree of capacitance of the variable capacitor (S430).

The resonance controller 140 compares the first input power Pin_n calculated before adjusting the degree of capacitance of the variable capacitor 132 and the second input power Pin_n+1 after decreasing the degree of capacitance of the variable capacitor with each other (S440).

If the second input power Pin_n+1 is smaller than the first input power Pin_n (Yes in S440), the resonance controller 140 further decreases the degree of capacitance of the variable capacitor (S420). This is to maintain a corresponding change trend, because the case in which the second input power Pin_n+1 is smaller than the first input power Pin_n means that the degree of capacitance is changed in the direction of decreasing the input power, that is, in the direction of increasing the efficiency.

If the second input power Pin_n+1 is not smaller than the first input power Pin_n (No in S440), the resonance controller 140 increases the degree of capacitance of the variable capacitor (S450). This is to reverse a change trend of the degree of capacitance, because the case in which the second input power Pin_n+1 is greater than the first input power Pin_n means that the degree of capacitance is changed in the direction of increasing the input power, that is, in the direction of decreasing the efficiency.

Although not illustrated in FIG. 4, in a case in which the second input power Pin_n+1 and the first input power Pin_n are the same as each other, the degree of capacitance is not changed.

Next, the detector 150 calculates third input power Pin_n+2 after the increase of the degree of capacitance of the variable capacitor (S460), and the resonance controller 140 compares the second input power Pin_n+1 and the third input power Pin_n+2 with each other (S470).

Similar to those described above, if the third input power Pin_n+2 is lower than the second input power Pin_n+1 after the increase of the capacitance of the variable capacitor, the resonance controller 140 performs a control so that the degree of capacitance is continuously increased (S450). On the other hand, if the third input power Pin_n+2 is not lower than the second input power Pin_n+1, the resonance controller 140 performs a control so that the degree of capacitance of the variable capacitor is decreased (S480).

In FIGS. 2 through 4, the wireless power transmitter adjusting the degree of capacitance of the resonator so that the input power of the inverter is decreased has been described. However, this is illustrative and various modified examples may be implemented.

For example, the wireless power transmitter may also be implemented to adjust inductance of the resonator so that the input power of the inverter is decreased. Alternatively, the resonator may also be adjusted so that input power of the power supply, not the inverter is decreased.

Hereinafter, an embodiment of a wireless power transmitter configured to increase efficiency of wireless charging will be described with reference to FIGS. 5 through 7. An embodiment of the wireless power transmitter relates to an calculating a predetermined power efficiency from a level of input power of the wireless power transmitter and a level of power received by the wireless power receiver, and a variable resonator of the wireless power transmitter is adjusted so that the power efficiency is increased.

Figure 5:
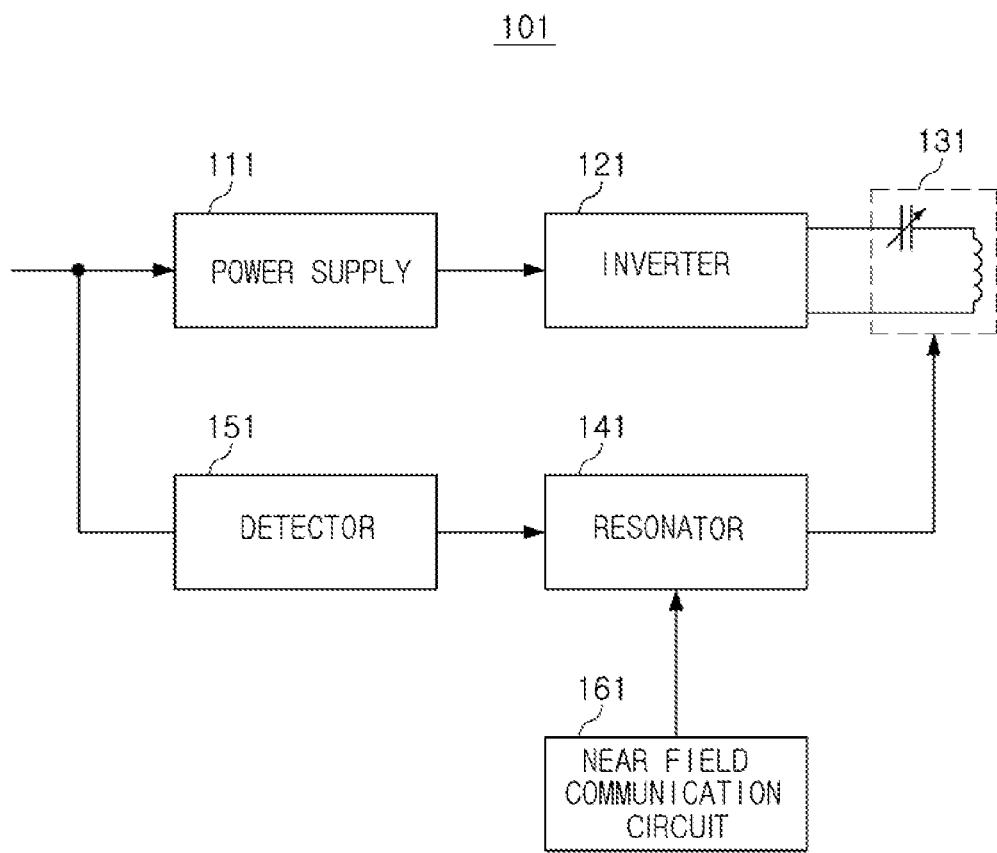
FIG. 5 is a block diagram illustrating a wireless power transmitter, according to an embodiment.

FIG. 5 is a block diagram illustrating a wireless power transmitter according to an embodiment.

Referring to FIG. 5, a wireless power transmitter 101, according to an embodiment, includes a power supply 111, an inverter 121, a resonator 131, a resonance controller 141, a detector 151, and a near field communication circuit 161.

The power supply 111, the inverter 121, and the resonator 131 may be understood from those described with reference to FIGS. 2 through 4.

The detector 151 detects input power of the wireless power transmitter 101. In the illustrated example, the detector 151 detects input power of the power supply 111 as the input power of the wireless power transmitter 101.

The near field communication circuit 161 receives information on reception power from the wireless power receiver. The near field communication circuit 161 provides the information on the reception power to the resonance controller 141.

The resonance controller 141 calculates power efficiency using the power received by the wireless power receiver and the input power of the wireless power transmitter 101, and adjusts a variable resonator of the resonator 131 so that the power efficiency is increased.

Figure 6:
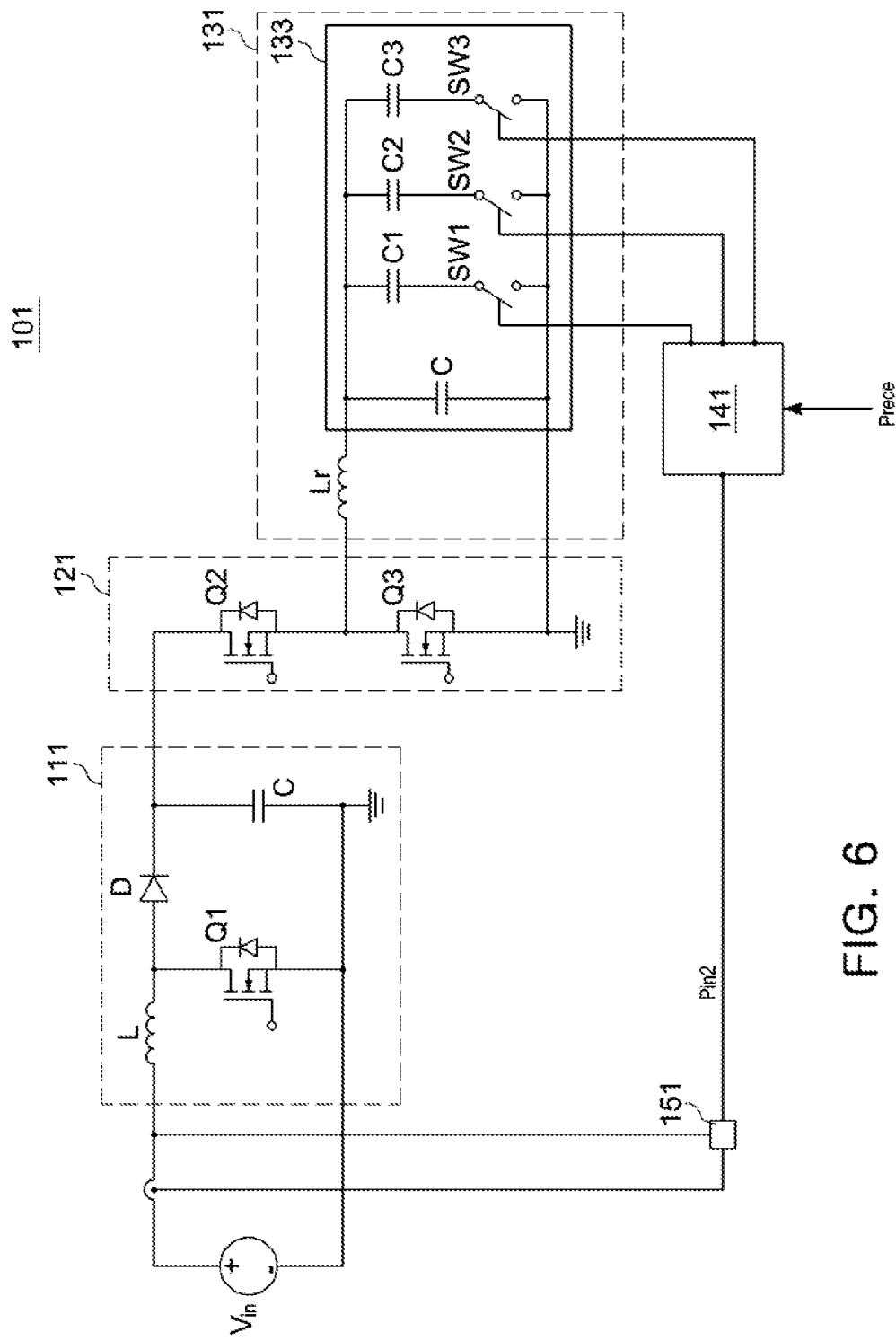
FIG. 6 is a circuit diagram illustrating a wireless power transmitter, according to an embodiment.

FIG. 6 is a circuit diagram illustrating the wireless power transmitter illustrated in FIG. 5.

Referring to FIG. 6, the wireless power transmitter 101 includes the power supply 111, the inverter 121, the resonator 131, the resonance controller 141, the detector 151, and the near field communication circuit 161 (shown in FIG. 5).

The power supply 111, the inverter 121, and the resonator 131 may be understood from those described with reference to FIGS. 2 through 4.

The resonance controller 141 adjusts capacitance of a variable capacitor 133 of the resonator 131.

The resonance controller 141 receives input power power Pin2 of the wireless power transmitter 101 from the detector 151, and receives reception power Prece of the wireless power receiver from the near field communication circuit 161.

The resonance controller 141 calculates the power efficiency using the input power Pin2 and the reception power Prece. For example, the resonance controller 141 calculates the power efficiency by dividing the input power Pin2 by the reception power Prece.

That is, since the reception power Prece of the wireless power receiver corresponds to output power of the wireless power transmitter 101, the resonance controller 141 calculates the power efficiency of the wireless power transmitter 101 using input power Pin2 and the reception power Prece.

Therefore, the resonance controller 141 confirms a change in the power efficiency of the wireless power transmitter 101 according to an adjustment of the variable resonator, and adjusts the variable resonator to follow the increase in power efficiency.

The resonance controller 141 compares first power efficiency before adjusting the degree of capacitance of the variable capacitor 133 and second power efficiency after adjusting the degree of capacitance of the variable capacitor 133 with each other, to thereby determine whether to increase or decrease the degree of capacitance of the variable capacitor 133.

Figure 7:
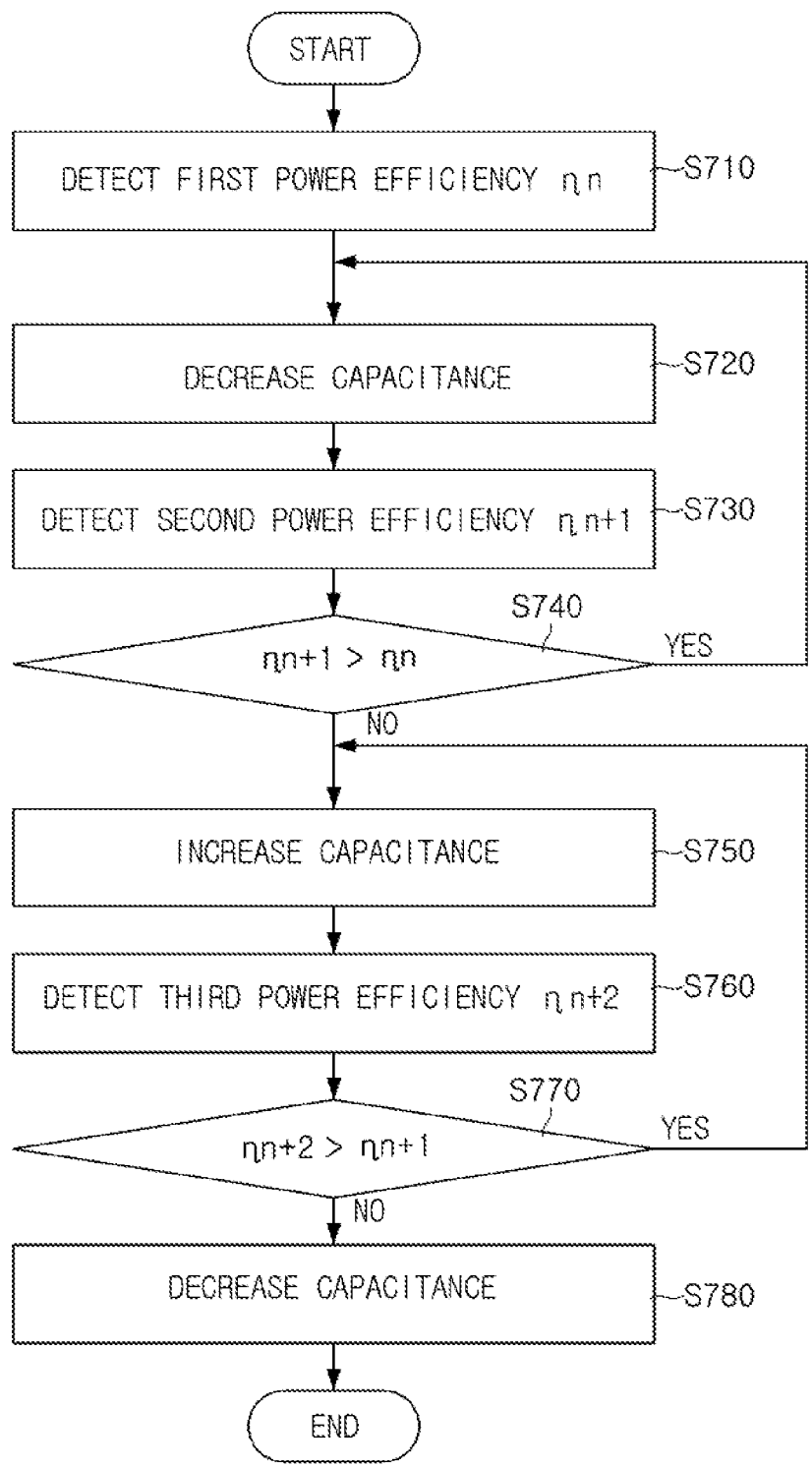
FIG. 7 is a flowchart illustrating a method for adjusting capacitance performed in a wireless power transmitter, according to an embodiment.

FIG. 7 is a flowchart illustrating a method for adjusting capacitance performed in the wireless power transmitter illustrated in FIG. 6. Hereinafter, an operation of the resonance controller 141 is described with reference to FIG. 7.

Referring to FIG. 7, the resonance controller 141 detects first power efficiency $\eta n$ using the input power and the reception power (S710).

Next, the resonance controller 141 decreases the degree of capacitance (S720), detects second power efficiency $\eta n+1$ (S730), and determines whether or not the decrease of the degree of capacitance increases the power efficiency (S740).

If the second power efficiency $\eta n+1$ is greater than the first power efficiency $\eta n$ (Yes in S740), since this means that the power efficiency is increased by the decrease of the degree of capacitance, the resonance controller 141 again decreases the degree of capacitance, and confirms a change in efficiency accordingly (S720 to S740).

If the second power efficiency $\eta n+1$ is not greater than the first power efficiency $\eta n$ (No in S740), since this means that the decrease of the degree of capacitance decreases the efficiency, the resonance controller 141 increases the degree of capacitance (S750), and confirms a change in the efficiency accordingly (S760 and S770). In a case in which the second power efficiency $\eta n+1$ and the first power efficiency $\eta n$ are the same as each other, the resonance controller 141 does not adjust the degree of capacitance.

Similarly, the resonance controller 141 calculates third power efficiency $\eta n+2$ (S760) and then compares the third power efficiency $\eta n+2$ with the second power efficiency $\eta n+1$ (S770). If the increase of the degree of capacitance increases the efficiency (Yes in S770), the resonance controller 141 increases the degree of capacitance (S750 to S770). If the increase of the degree of capacitance decreases the efficiency (No in S770), the resonance controller 141 decreases the degree of capacitance (S780).

The example of FIG. 7 follows a case in which the degree of capacitance is first decreased, but this is merely illustrative. In addition, the example in which the degree of capacitance is decreased or increased by comparing current input power and previous input power with each other is illustrated in FIG. 7, but according to an embodiment, in a case in which current efficiency and previous efficiency are the same as each other, the degree of capacitance is maintained.

The apparatuses, units, modules, devices, controllers, and other components illustrated in FIGS. 1-3, 5 and 6 that perform the operations described herein with respect to FIGS. 4 and 7 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations or algorithms described herein with respect to FIGS. 4 and 7.

The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4 and 7 that perform the operations described herein may be performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art, after gaining a thorough understanding of the present disclosure, can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As set forth above, according to the embodiments, the wireless power transmitter increases efficiency of the wireless charging between the wireless power receiver and the wireless power transmitter.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmitter, comprising:
   a resonator including a variable resonator, the variable resonator including a variable capacitor;
   an inverter configured to operate the resonator; and
   a controller configured to adjust a first capacitance of the variable resonator so that an input power to the inverter is decreased in response to a change in a level of the input power to the inverter,
   wherein the controller is further configured to re-adjust the first capacitance of the variable resonator based on the input power to the inverter before and after the adjustment of the first capacitance of the variable resonator, and
   the controller is further configured to adjust a second capacitance of the variable capacitor in response to the change in the level of the input power to the inverter.

2. The wireless power transmitter of claim 1, wherein the controller is further configured to adjust a degree of the second capacitance of the variable capacitor to decrease the level of the input power to the inverter.

3. The wireless power transmitter of claim 1, wherein the controller is further configured to increase or decrease a degree of the second capacitance of the variable capacitor based on a first level of a first input power to the inverter before adjusting a degree of the second capacitance of the variable capacitor and a second level of a second input power to the inverter after adjusting the degree of the second capacitance of the variable capacitor.

4. The wireless power transmitter of claim 1, wherein the controller is further configured to further decrease a degree of the second capacitance of the variable capacitor based on a first level of a first input power to the inverter before adjusting the degree of the second capacitance of the variable capacitor and a second level of a second input power to the inverter after adjusting the degree of the second capacitance of the variable capacitor, when the first level of the first input power is higher than the second level of the second input power.

5. The wireless power transmitter of claim 1, wherein the controller is further configured to increase a degree of the second capacitance of the variable capacitor based on a first level of a first input power to the inverter before adjusting a degree of the second capacitance of the variable capacitor and a second level of a second input power to the inverter after adjusting the degree of the second capacitance of the variable capacitor, when the first level of the first input power is lower than the second level of the second input power.

6. The wireless power transmitter of claim 1, further comprising:
a detector configured to detect an input voltage and an input current of the inverter and calculate the input power based on the input voltage and the input current.

7. The wireless power transmitter of claim 6, wherein the controller is further configured to adjust the first capacitance of the variable resonator so that the input power calculated by the detector is decreased.

8. A wireless power transmitter, comprising:
a power supply configured to adjust a voltage of an input power, and output an adjusted input power;
a resonator including a variable resonator, the variable resonator including a variable capacitor;
an inverter configured to receive the adjusted input power from the power supply and operate the resonator;
a detector configured to calculate a first level of the adjusted input power received by the inverter in the wireless power transmitter; and
a controller configured to adjust a capacitance of the variable capacitor in response to a change in the first level of the adjusted input power, the controller further configured to calculate power efficiency by dividing the first level of the adjusted input power received by the inverter in the wireless power transmitter by a second level of an output power received by a wireless power receiver, which is adjacent to the wireless power transmitter, and adjust a degree of the capacitance of the variable capacitor so that the power efficiency is increased.

9. The wireless power transmitter of claim 8, wherein the detector is further configured to calculate the first level of the adjusted input power by detecting an input voltage and an input current of the adjusted input power, which is provided from the power supply to the inverter.

10. The wireless power transmitter of claim 8, further comprising:
a near field communication circuit configured to receive information on the second level of the output power received by the wireless power receiver from the wireless power receiver.

11. The wireless power transmitter of claim 8, wherein the controller is further configured to determine whether to increase or decrease the degree of the capacitance of the variable capacitor based on a first power efficiency before adjusting the degree of the capacitance of the variable capacitor and a second power efficiency after adjusting the degree of the capacitance of the variable capacitor.

12. The wireless power transmitter of claim 8, wherein the controller is further configured to further decrease the degree of the capacitance of the variable capacitor based on a first power efficiency before adjusting the degree of the capacitance of the variable capacitor and a second power efficiency after adjusting the degree of the capacitance of the variable capacitor, when the second power efficiency is higher than the first power efficiency.

13. The wireless power transmitter of claim 8, wherein the controller is further configured to further increase the degree of the capacitance of the variable capacitor based on first power efficiency before adjusting the degree of the capacitance of the variable capacitor and second power efficiency after adjusting the degree of the capacitance of the variable capacitor, when the second power efficiency is lower than the first power efficiency.

14. A method of controlling a wireless power transmission, comprising:
operating a power supply to provide power to a variable resonator including a variable capacitor;
actuating a detector to determine an input power to or output from the power supply; and
adaptively adjusting, by a controller, a resonance characteristic of the variable resonator in response to determined input power,
wherein the adaptively adjusting includes re-adjusting the resonance characteristic of the variable resonator based on the determined input power before and after adaptively adjusting the resonance characteristic of the variable resonator, and
the adaptively adjusting includes adjusting capacitance of the variable capacitor.

15. The method of claim 14, further comprising:
transmitting a wireless power signal to a wireless power receiver;
operating a wireless communication circuit to receive an indicia about the wireless power signal received by the wireless power receiver; and
adaptively adjusting the resonance characteristic of the variable resonator in response to the indicia and the determined input power.

16. The method of claim 14, wherein the adaptively adjusting the resonance characteristic of the variable resonator includes adaptively adjusting the resonance characteristic of the variable resonator in response to a change in the determined input power.

* * * * *